United States Patent [19]

Nemoto

[11] Patent Number: 5,001,941
[45] Date of Patent: Mar. 26, 1991

[54] TRANSMISSION ASSEMBLY FOR TRACTORS

[75] Inventor: Shusuke Nemoto, Yao, Japan
[73] Assignee: Kanzaki Kokyukoki Mfg. Co., Ltd., Japan
[21] Appl. No.: 500,747
[22] Filed: Mar. 28, 1990
[30] Foreign Application Priority Data
  Apr. 24, 1989 [JP] Japan .................. 1-48012[U]
[51] Int. Cl.⁵ .......................................... F16H 37/00
[52] U.S. Cl. ................................ 74/15.63; 74/15.84
[58] Field of Search ................. 74/15.6, 15.63, 15.84
[56] References Cited

U.S. PATENT DOCUMENTS

| 4,245,514 | 1/1981 | Miyahara et al. | 74/15.84 |
| 4,275,608 | 6/1981 | Brancolini | 74/15.63 |
| 4,360,091 | 11/1982 | Sada et al. | 74/15.63 X |

FOREIGN PATENT DOCUMENTS 0296770 12/1988 European Pat. Off. ........... 74/15.84
56-97128 1/1981 Japan .
58-22557 12/1983 Japan .
59-37131 8/1984 Japan .

Primary Examiner—Dirk Wright

[57] ABSTRACT

An additional speed change mechanism (11) is incorporated in a vehicle-driving power transmission path of a tractor. The change mechanism is disposed within a main clutch housing (1) using axially spaced front and rear bearing support frames (6, 7) as supports for transmission shafts (9, 10, 11) associated to the mechanism. The front frame is fixedly mounted on a front surface of an internal flange (5) on the housing and may also be used as a support for preassembling the mechanism at the outside of clutch housing. The rear frame is fixedly mounted on a front surface of rear wall (1a) of the housing and may be varied in configuration in accordance with a given design of the change mechanism. An adaptability to various designs of the change mechanism is given while assuring an easy assemblage of the change mechanism into the clutch housing.

2 Claims, 5 Drawing Sheets

TRANSMISSION ASSEMBLY FOR TRACTORS

FIELD OF THE INVENTION

This invention relates to a transmission assembly for tractors of a type in which a clutch housing and transmission casing are arranged in series in a longitudinal direction of the vehicle and are fastened together. The clutch housing includes in its front end portion a main clutch, and the transmission casing includes therein a first input shaft, which is incorporated in a vehicle-driving power transmission path, and a second input shaft which is incorporated in an auxiliary implement-driving power transmission path.

More particularly, the present invention relates to a transmission assembly for tractors which includes between a clutch housing and transmission casing a hollow shaft means, for transmitting vehicle-driving power into the transmission casing, and a power takeoff shaft means, which passes through the hollow shaft means, for transmitting auxiliary implement-driving power into the transmission casing.

BACKGROUND OF THE INVENTION

The purpose of providing a hollow shaft means, through which a power takeoff shaft means passes, between a clutch housing and transmission casing in the fashion set forth above is to enable an engine to drive the vehicle and an auxiliary implement such as a rotary tiller, mower or the like in manners different from each other. When a dual clutch is employed as a main clutch, it is fashioned such that transmission of the vehicle-driving power is cut off by a first-stage operation of the clutch and, then, transmission of the auxiliary implement-driving power is cut off by a second-stage operation of the clutch. When a separate power takeoff clutch is employed as shown, for example, in JP, A(U) No. 56-97128, a main clutch which can cut off only the transmission of vehicle-driving power is employed and a primary drive shaft in the implement-driving power transmission path is connected directly to the engine.

Tractors are used in conjunction with auxiliary implements for various purposes such as earth-moving, mowing or reaping, article-loading purposes and, thus, various transmissions of different designs are required. An economical way of providing different designs to tractor transmissions is that an additional transmission or speed-change mechanism is provided within a rear half of a clutch housing which includes a substantial dead space behind a main clutch. There have been proposed various structures for such additional transmission mechanism.

These prior art structures may be divided into two types. One of these types employs an additional casing as a support for an additional speed-change mechanism as shown, for example, in JP, A(U) No. 59-37131. The other type employs a support frame which is fixedly mounted in the clutch housing for supporting an additional speed-change mechanism or its transmission shafts, as shown, for example, in JP, A(U) No. 58-22557.

The structure of the former type involves a problem that it is relatively large in weight due to employment of the additional casing so that it is relatively hard to assemble same into the clutch housing. Further, an additional speed-change mechanism of a different design requires a different casing. Such casing is relatively large in size and, therefore, relatively expensive in cost.

The structure of the latter type employing a support frame is small in weight and, therefore, permits an easy assemblage into the clutch housing of a tractor. Cost of this structure is considerably low as compared to the structure employing an additional casing. However, in the prior art structure of this type, a single support frame is employed and transmission shafts are supported by the support frame and by a rear wall of the clutch housing. Such single support frame often requires, when the design of an additional speed-change mechanism is changed, a clutch housing having a rear wall of a different design.

OBJECT

Accordingly, a primary object of the present invention is to provide an improved transmission assembly for tractors in which an additional speed-change mechanism is provided within the clutch housing of a tractor in a fashion such that the assembly can be adapted easily to various designs of the additional speed-change mechanism while an easy assemblage into the clutch housing of a tractor is secured.

BRIEF DESCRIPTION OF THE DRAWINGS

Other objects and advantages of the invention will become readily apparent as the specification is considered in conjunction with the accompanying drawings in which.

SUMMARY OF THE INVENTION

Figure 1:
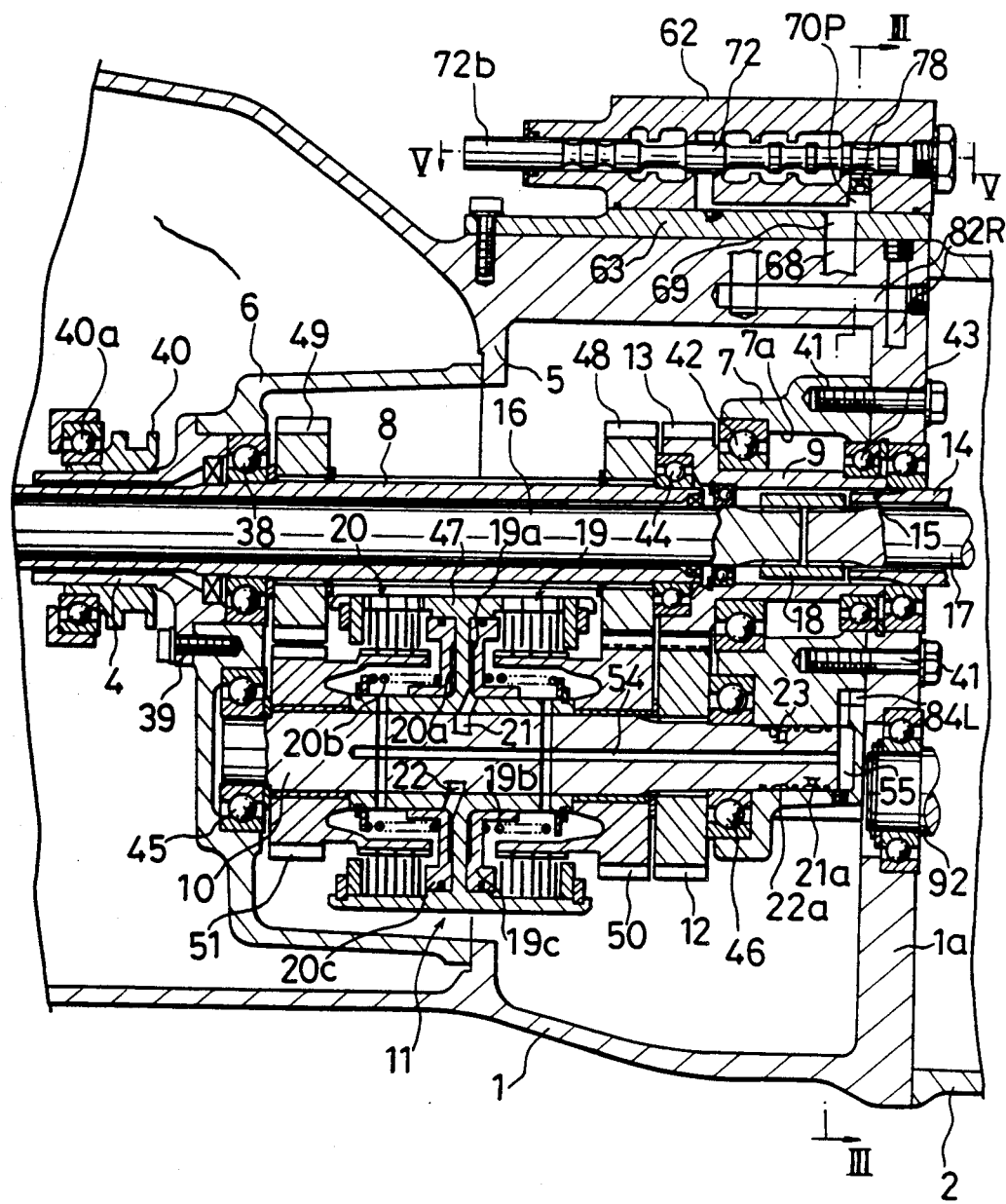
FIG. 1 is a sectional side view of a part of a tractor in which an embodiment of the transmission assembly according to the present invention is employed.
Figure 4:
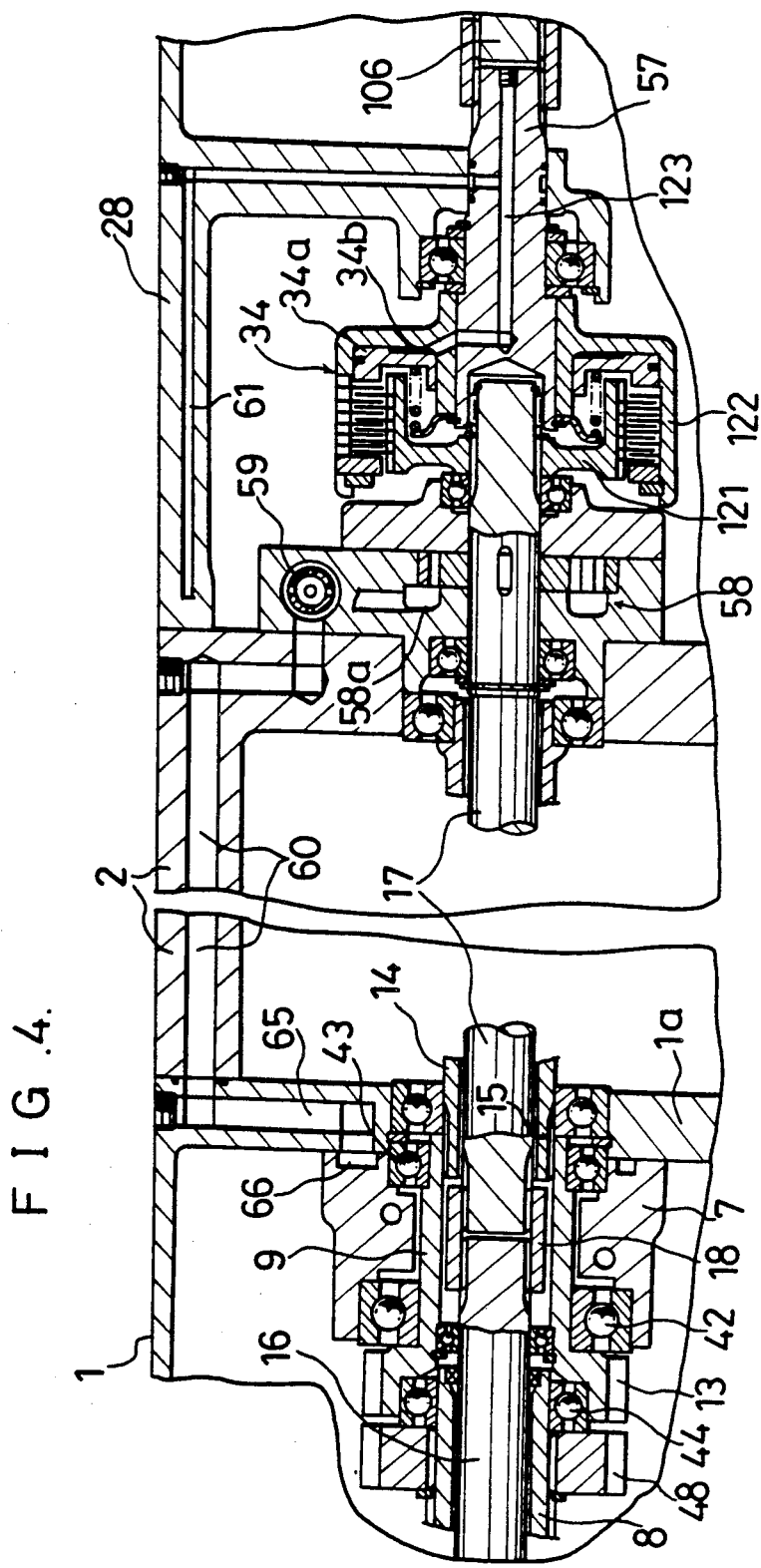
FIG. 4 is a sectional plan view, partially cut away, taken generally along line IV—IV of FIG. 3.

As depicted in FIGS. 1 and 4, the tractor shown has a clutch housing 1 and transmission casing 2 which are arranged in series in a longitudinal direction of the tractor and are fastened together. As is usual, the clutch housing 1 includes in its front end portion (not shown) a main clutch 3 which is illustrated schematically in FIG. 2. The transmission casing 2 includes in it a first input shaft 14 shown in FIGS. 1, 2 and 4, which is incorporated in a vehicle-driving power transmission path, and a second input shaft, also shown in FIGS. 1, 2 and 4, which is incorporated in an auxiliary implement-driving power transmission path.

According to the present invention, a pair of front and rear bearing support frames 6 and 7 shown in FIG. 1 are provided within the clutch housing 1. Of these frames, the front bearing support frame 6 is fixedly mounted on a front surface of an internal flange 5 on the clutch housing and has a forwardly extending support sleeve 4 which supports a slidable release shifter 4 for releasing the main clutch 3 shown in FIG. 2. The rear bearing support frame 7 is fixedly mounted on a front surface of a rear wall 1a of the clutch housing 1.

Figure 2:
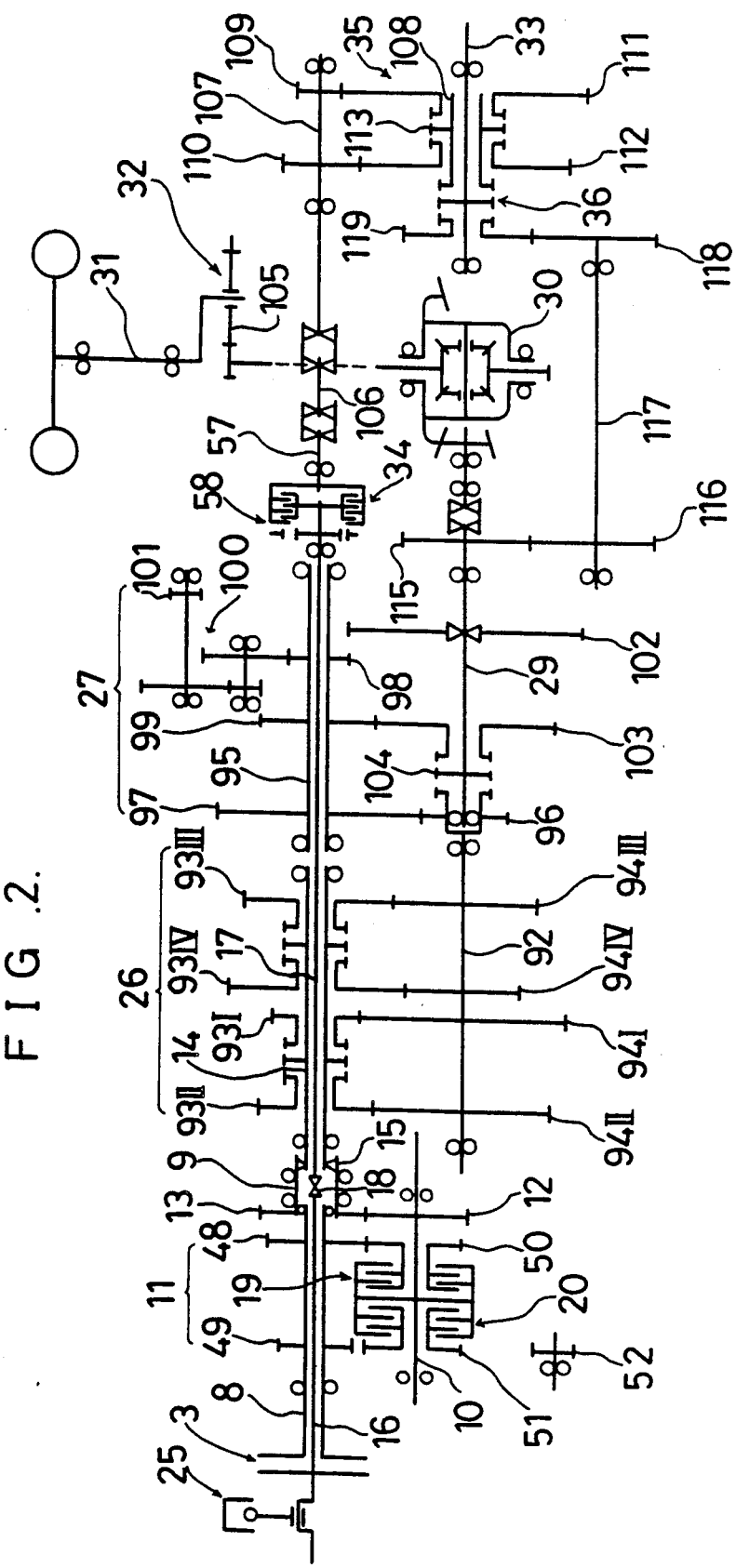
FIG. 2 is a schematic view showing a transmission system employed in the tractor set forth above.

As also shown in FIG. 1, a hollow drive shaft 8, a hollow intermediate shaft 9 disposed behind and co-axially with the drive shaft 8, and a speed-change shaft 10 disposed parallel to the drive shaft 8 are journalled in the clutch housing 1 using the front and rear bearing support frames 6 and 7. The drive shaft 8 is connected, as shown in FIG. 2, drively to an engine 25 via the main clutch 3. As shown in FIGS. 1 and 2, a two-ratio speed change mechanism 11 is disposed between the drive shaft 8 and speed-change shaft 10. The speed-change shaft 10 is connected drivingly to the intermediate shaft 9 via meshing gears 12 and 13.

As shown in FIGS. 1 and 4, the first input shaft 14 is formed into a hollow shaft and is journalled in the transmission casing 2 co-axially with the intermediate shaft 9. This input shaft 14 projects at its front end into the clutch housing 1 and is coupled to the intermediate shaft 9 using a splined connection 15.

As shown in FIGS. 1, 2 and 4, a power takeoff drive shaft 16, driven by engine 25, is provided which extends through the hollow drive shaft 8. The second input shaft 17 extends through the hollow, first input shaft 14 and is coupled at its front end to the power takeoff drive shaft 16 using a coupling sleeve 18 which is disposed within the hollow intermediate shaft 9.

In a preferred embodiment shown, the two-ratio speed change mechanism 11 is fashioned to a fluid-operated mechanism having two fluid-actuated clutches 19 and 20 which are mounted on the speed-change shaft 10. The rear bearing support frame 7 is provided with a cylindrical bore 23 which receives a rear end portion of the speed-change shaft 10. The rear end portion of shaft 10 includes at its outer surface two annular grooves 21a and 22a which communicate with two clutch-operating fluid passages 21 and 22 in the change shaft 10. These annular grooves 21a and 22a are sealed by an inner circumferential wall of the bore 23, whereby two annular chambers are provided within the rear bearing support frame 7. These annular chambers provide rotary joints for connecting fluid passages 21 and 22 in the rotating change shaft 10 to fluid passages which are fixed in position.

For assembling the transmission mechanism shown in FIG. 1 into the clutch housing 1, the rear bearing support frame 7 supporting previously the intermediate shaft 9 is firtly attached to the front surface of the rear wall 1a of clutch housing. The speed change mechanism 11 and power takeoff drive shaft 16 are preassembled at the outside of clutch housing using the front bearing support frame 6 as a support and then are inserted into the housing 1 from its front opening. And, the front frame 6 is attached to the front surface of the internal flange 5. Transmission casing 2 is attached to the rear of clutch housing 1 in such a fashion that the first and second input shafts 14 and 17 project into the clutch housing 1. This may be done either before or after the assemblage of change mechanism 11 into the clutch housing. The coupling sleeve 18 may be attached previously to either the drive shaft 16 or second input shaft 17.

Because the rear bearing support frame 7 supporting previously the hollow intermediate shaft 9 may be fixedly mounted previously on the front surface of rear wall 1a of the clutch housing 1 and because the additional two-ratio speed change mechanism 11 may be preassembled at the outside of clutch housing 1 using the front bearing support frame 6 as a support and then may be assembled into the clutch housing 1, the transmission assembly according to the present invention may be assembled into the clutch housing of a tractor with ease.

Employment of a pair of bearing support frames 6 and 7 enhances flexibility or adaptability of the transmission assembly to various designs of the two-ratio speed change mechanism 11. When a two-ratio speed change mechanism of a different axial width is to be employed, a front bearing support frame 6 projecting forwardly from the position of the internal flange 5 by a different amount may be employed so as to adapt the axial interval between the front and rear frames 6 and 7 to the different axial width of such speed-change mechanism 11. Shape, size, arrangement and size of bores, and the like of the rear bearing support frame 7 may be adapted to a given design of the additional speed change mechanism 11 so as to eliminate a necessity of employing a clutch housing having a rear wall 1a of a different design.

The cylindrical bore 23 in the rear frame 7 which receives a rear end portion of the speed-change shaft 10 for a fluid-operated speed change mechanism 11 contributes to a simplicity of fluid supply system for fluid-actuated clutches 19 and 20 of the change mechanism, because it permits an easy formation of rotary joints between stationary and rotating fluid passages and because it also permits an easy formation of fluid passages directed into the bore 23 using the rear frame 7 and rear wall 1a of the clutch housing and without using separate conduit members.

DESCRIPTION OF A PREFERRED EMBODIMENT

As shown in FIG. 2, the hollow drive shaft 8 for transmitting vehicle-driving power is connected to engine 25 via the main clutch 3, whereas the power take-off drive shaft 16 shown is connected directly to the engine. Within the transmission casing 2 and in the vehicle-driving power transmission path, a main speed change mechanism 26 and auxiliary speed change mechanism 27 shown in FIG. 2 are disposed in series. Within a rear housing 28 (FIG. 4) which is secured to the rear of the transmission casing 2, a differential gearing 30 is disposed which is driven by a propeller shaft 29 constituting a speed-change shaft of the auxiliary speed change mechanism 27. Left and right output shafts of the differential gearing 30 are connected to left and right rear wheel axles 31 (only one of which is shown) via left and right speed-reducing planetary gears 32. The second input shaft 17 referred to before is connected to a PTO (power takeoff) shaft 33 shown in FIG. 2, which extends rearwards from the rear housing 28, via a PTO-clutch 34, PTO speed change mechanism 35, and PTO selecting clutch 36.

As shown in FIG. 1, the front bearing support frame 6 is generally U-shaped in section to extend forwardly from the front surface of internal flange 5 on the clutch housing and is secured to the flange 5 using fastening bolts (not shown). The support sleeve 4 referred to before is also used as a retainer for a ball bearing 38, via which the hollow drive shaft 8 is rotatably supported by the front frame 6, and is secured to the frame 6 using bolts 39. Release shifter 40 carrying a clutch throwout bearing 40a is slidably received by the support sleeve 4. As is usual, the main clutch 3 shown in FIG. 2 is disengaged when the release shifter 40 is moved to slide forwardly by means of a clutch pedal (not shown).

Figure 3:
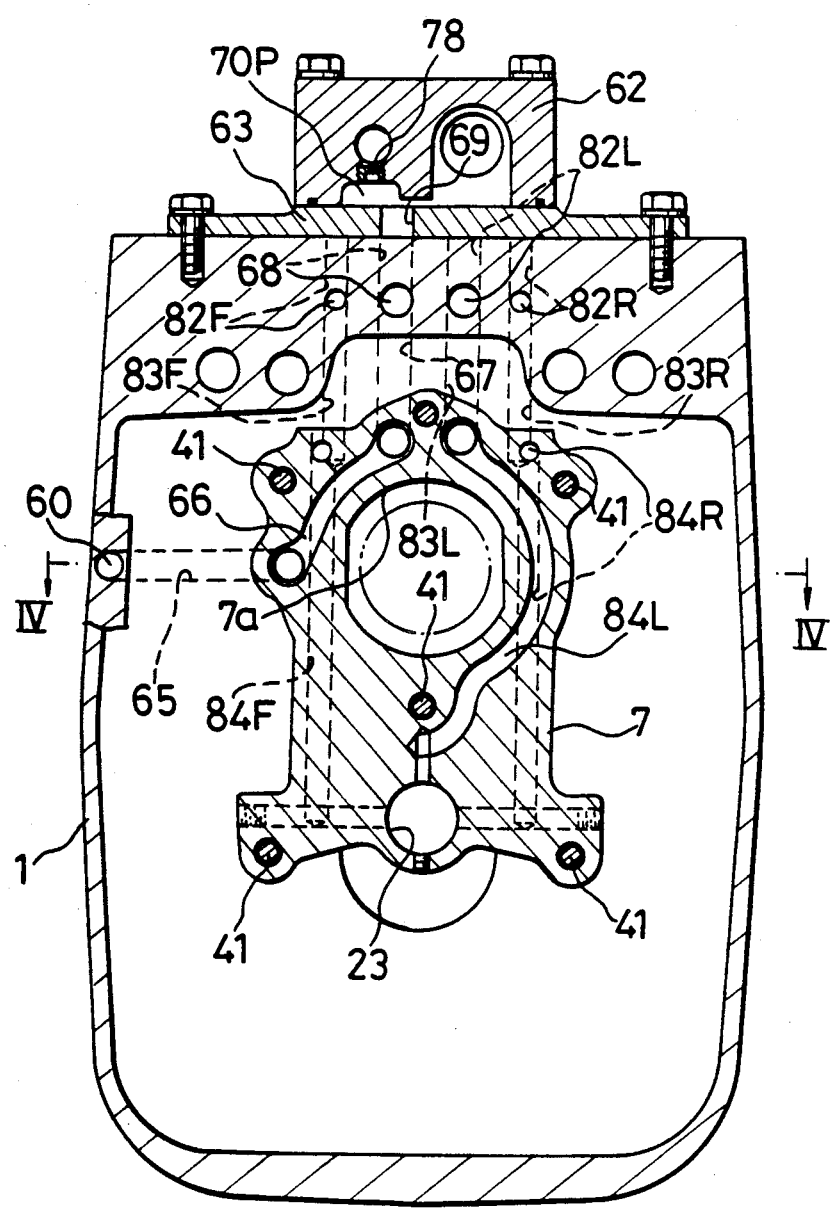
FIG. 3 is a sectional front view, partially omitted, taken generally along line III—III of FIG. 1.

As shown in FIGS. 1 and 3, the rear bearing support frame 7 is sized to have a width much smaller than that of the clutch housing 1 and is fixedly mounted on the front surface of rear wall 1a of the housing by means of bolts 41 which secure the frame 7 from the rear side of the wall 1a. In this rear frame 7 are formed a large thorough bore 7a for passing the hollow intermediate shaft 9, the hollow cylindrical bore 23, referred to before, the rear end of which is closed, and fluid passages which will be detailed later.

The hollow intermediate shaft 9 is rotatably supported at its front and rear end portions by the rear bearing support frame 7 via ball bearings 42 and 43. A rear end portion of the hollow drive shaft 8 is supported by the intermediate shaft 9 via a ball bearing 42 so that the shaft 8 is supported by the rear frame 7 via the intermediate shaft. The speed-change shaft 10 is rotatably supported by the front and rear bearing frames 6 and 7 via ball bearings 45 and 46.

The two-ratio speed change mechanism 11 shown is fashioned to a fluid-operated mechanism having two fluid-actuated clutches 19 and 20 of a multi-frictional disk type one of which provides a forward direction speed ratio when actuated and the other of which provides a backward direction speed ratio when actuated. A clutch casing 47 common to both of the clutches is fixedly mounted on the speed-change shaft 10. Tow gears 48 and 49 are fixedly mounted on the drive shaft 8, and two gears 50 and 51 are rotatably mounted on the change shaft 10. Of these gears, gears 48 and 50 are meshed directly so as to provide a forward direction gear train. Gears 49 and 51 are engaged via an idler gear 52 shown in FIG. 2 so as to provide a backward direction gear train. As is usual, each of the fluid-actuated clutches 19 and 20 comprises opposite sets of frictional elements which are slidably but non-rotatably supported respectively by the clutch casing 47 and by each of the gears 50 and 51, a fluid chamber 19a, 20a formed in the clutch casing, a return spring 19b, 20b for disengaging the clutch, and an annular piston 19c, 20c which is moved against the biasing of spring 19b, 20b, when fluid under pressure is supplied into the fluid chamber 19a, 20a, so as to cause a frictional engagement between the opposite sets of frictional elements and to thereby couple each of the gears 50 and 51 to the change shaft 10.

Fluid chambers 19a and 20a of the fluid-actuated clutches 19 and 20 are connected, respectively, to the operating fluid passages 21 and 22, referred to before, in the change shaft 10. This shaft 10 further includes a lubricant passage 54 for supplying lubricant to the frictional elements of clutches 19 and 20. The lubricant passage 54 opens at an inner end space 55 in the cylindrical bore 23 which receives a rear end portion of the change shaft 10.

The aforementioned meshing gears 12 and 13 connect the change shaft 10 to the intermediate shaft 9. Of these gears, gear 12 is fixedly mounted on the change shaft whereas gear 13 is formed integrally with the intermediate shaft. The hollow intermediate shaft 11 is formed to have a small length and to have a diameter larger than those of the hollow drive shaft 8 and first input shaft 14. This shaft 11 is provided at its rear end portion with internal splines for the splined connection 15 with the hollow input shaft 14 which is in turn provided at its front end portion with external splines. The aforementioned coupling sleeve 18 for coupling two co-axial shafts 16 and 17 in the implement-driving power transmission path has in its inner circumference splines.

Fluid supply system associated with the transmission assembly shown will be detailed hereinafter. As shown in FIGS. 2 and 4, the PTO-clutch 34 referred to before is fashioned to a fluid-actuated clutch of a multi-frictional disk type and is disposed between the second input shaft 17, which projects into the rear housing 28, and a clutch shaft 57 which is journalled in the rear housing at an extension of the input shaft 17. A gear pump 58 for supplying fluid to the PTO-clutch 34 and fluid-actuated clutches 19 and 20 of the speed change mechanism 11 is provided using the second input shaft 17 as its pump shaft and is mounted on a rear surface of the transmission casing 1. As shown in FIG. 4, the pump casing of this pump 58 includes a flow divider valve 59 which divides fluid flow from the discharge port 58a of pump into two flows. One of the outlet ports of this divider valve 59 communicates with a fluid passage 60 in a side wall of the transmission casing 2, whereas the other of the outlet ports of valve 59 communicates with a fluid passage 61 in a side wall of the rear housing 28 via a control valve (not shown) for the PTO-clutch 34. On an upper surface of the clutch housing 1 is fixedly mounted a valve housing 62 which includes a valve mechanism shown in FIG. 5. A plate member 63 is interposed between the clutch housing 1 and valve housing 62.

As shown in FIGS. 3 and 4, the fluid passage 60 set forth above communicates with a fluid passage 66 in the rear bearing support frame 7 through a fluid passage 65 in the rear wall 1a of clutch housing 1. As shown in FIG. 3, the fluid passage 66 communicates with an inlet port 70P in the valve housing 62 through a fluid passage 67 in the rear wall 1a and forwardly and upwardly running fluid passage 68 in the top wall of clutch housing 1, and through a thorough bore 69 in the plate member 63.

Figure 5:
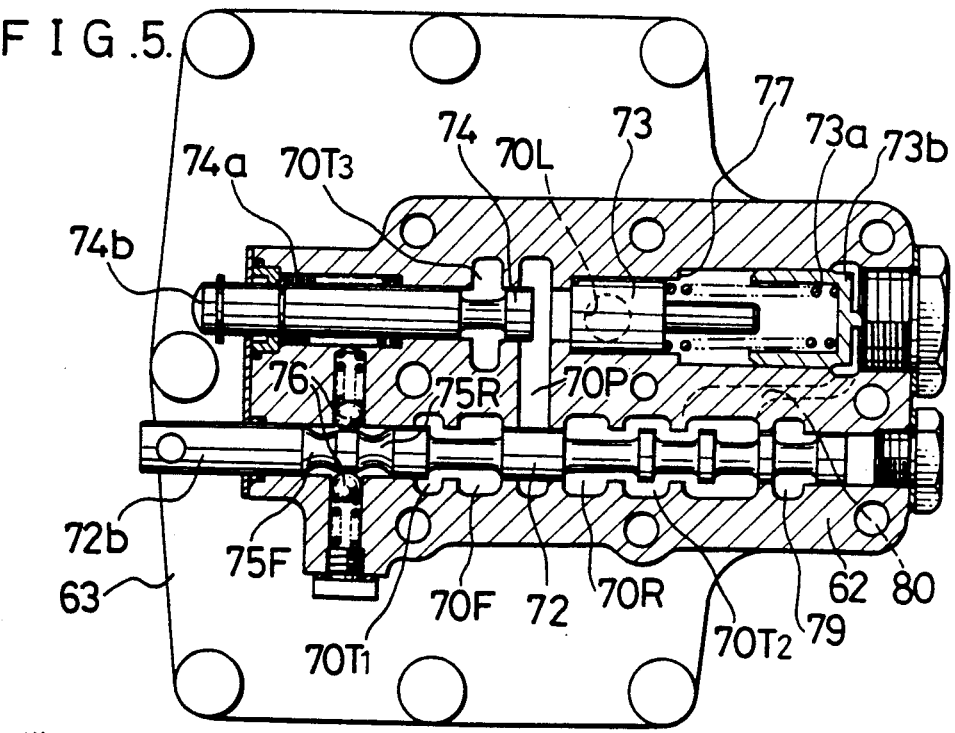
FIG. 5 is an enlarged sectional plan view taken along line V—V of FIG. 1.

As shown in FIG. 5, the valve housing 62 includes a control valve 72 for controlling supply of fluid to the fluid-actuated clutches 19 and 20 of speed change mechanism 11, a modulating relief valve 73 for determining fluid pressure applied to the clutches 19 and 20, and a pressure-reducing valve 74 for selectively reducing fluid pressure applied to the clutches 19 and 20 so as to attain a slipping engagement of the clutches.

As shown in FIGS. 1 and 3, the inlet port 70P extends longitudinally and laterally of the valve housing by some extent. The control valve 72 is fashioned such that, when it is placed in a neutral position shown in FIG. 5, a forward direction clutch port 70F is connected to a fluid drainage port $70T_1$ and a backward direction clutch port 70R is connected to a fluid drainage port $70T_2$. And, when the valve 72 is displaced rearwardly into a forward direction position, the inlet port 70P is connected to the forward direction clutch port 70F, whereas, when the valve 72 is displaced forwardly into a backward direction position, the inlet port 70P is connected to the backward direction clutch port 70R. This control valve 72 is latched in its forward and backward direction positions respectively by a pair of latching balls 70 which project into respective annular grooves 75F and 75R in the outer surface of valve 72 under the biasing of springs.

The relief valve 73 determines fluid pressure in the inlet port 70P by a fluid-relieving operation from the inlet port to a lubricant port 70L. Pressure-determining spring 73a of the relief valve 73 is received at its base end by a control piston 73b which may advance from the position shown in FIG. 5 up to a position where an annular shoulder 77 in the valve housing 72 limits the advancing movement of piston 73b. A space 79, which communicates with the inlet port 70P through an orifice 78, and a fluid passage 80 for communicating the space 79 with the back of control piston 73b are formed in the valve housing 62 such that, when the control valve 72 is placed in the neutral position shown in FIG. 5, the space 79 is blocked by the valve 72 and the fluid passage 80 is connected to the drainage port 70T$_2$ also by the valve 72. When the control valve is displaced into its forward or backward direction position, the space 79 is connected to the fluid passage 80 so that fluid is supplied to the back of control piston 73b at a restricted rate determined by orifice 78. By this, the control piston 73b is advanced gradually so as to strengthen the force of spring 73a so that fluid pressure applied to the clutch 19 or 20 is enlarged gradually up to a predetermined normal high value.

The pressure-reducing valve 74 is fashioned such that, when it is pushed against the biasing of a spring 74a from the position shown in FIG. 5 into the valve housing, the inlet port 70P is brought in a variable restricted fluid communication with a fluid drainage port 70T$_3$ so that fluid pressure in the inlet port, namely fluid pressure applied to the clutch 19 or 20 at the forward or backward direction position of control valve 72, is reduced so as to cause a variable slipping engagement of the clutch.

As shown in FIGS. 1 and 3, the forward and backward direction clutch ports 70F and 70R are communicated respectively with fluid passages 84F and 84R in the rear bearing support frame 7 through fluid passages 82F, 83F and 82R, 83R in the top and rear walls of clutch housing 1. The fluid passages 84F and 84R in the frame 7 open, respectively, at the cylindrical bore 23 so as to communicate with the aforementioned annular grooves 21a and 22a. The lubricant port 70L is communicated with the inner end space 55 in the cylindrical bore 23 through similar fluid passages 82L, 83L and 84L.

Figure 6:
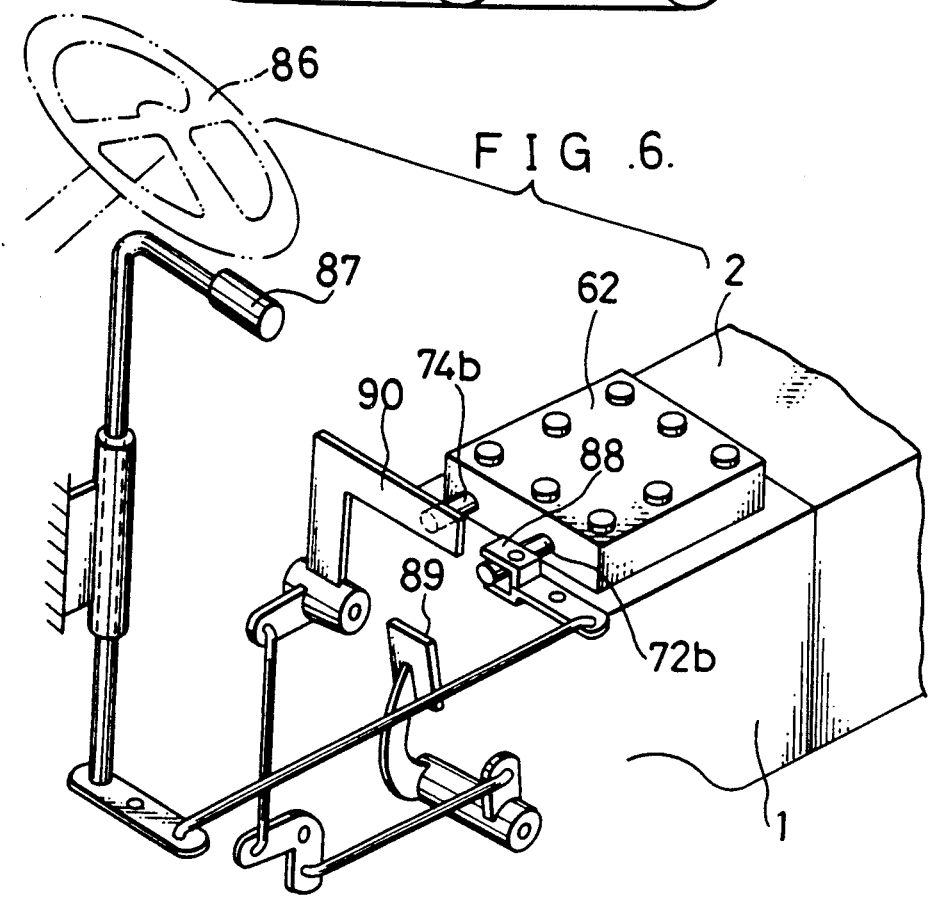
FIG. 6 is a schematic perspective view showing a control mechanism for valves shown in FIG. 5.

The control valve 72 and pressure-reducing valve 74 extend respectively at their control ends 72b and 74b forwardly from the valve housing 62 and are operated using a control mechanism shown in FIG. 6. This control mechanism includes a change-over lever 87 disposed adjacent to a vehicle-steering wheel 86. A fork 88 which is operated by the lever 87 to rotate about a vertical axis engages the control end 72b of valve 72 so as to displace the control valve by an operation of the change-over lever 87. An operating plate 90 is provided which is operated by a pedal 89 to swing forwardly and backwardly about a horizontal axis. The pressure-reducing valve 74 engages, at its control end 74b, the operating plate 90 under the biasing of the spring 74a shown in FIG. 5 so that, when the pedal 89 is trod down, the valve 74 is pushed into the valve housing 62 whereby fluid pressure applied to the clutch 19 or 20 is reduced. By a slipping engagement of the clutch 19 or 20 achieved by a treading-down operation of the pedal 89, the vehicle may be travelled forwardly or backwardly with a desired low speed.

The main speed change mechanism 26 shown in FIG. 2 is fashioned to a synchromesh transmission mechanism which performs four-ratio speed change transmission between the hollow input shaft 14 and a speed-change shaft 92 which is journalled in the transmission casing 2 parallel to the shaft 14. Numerals 93I and 94I, 93II and 94II, 93III and 94III, and 93IV designate, respectively, constantly meshing gears providing first to fourth change gear trains.

As shown in FIG. 2, the auxiliary speed change mechanism 27 is fashioned such that it performs a four-ratio speed change transmission between the co-axially arranged speed-change shaft 92 and propeller shaft 29. This change mechanism 27 includes a hollow intermediate shaft 95 which is rotatably mounted on the second input shaft 17 and is drivenly connected to the change-shaft 92 via meshing gears 96 and 97. Second and third gears 98 and 99 are fixedly mounted on the intermediate shaft 95. Of these gears, the second gear 98 which is smaller than the third gear 99 drives to rotate via a speed-reduction gearing 100 a gear 101 which is rotatably mounted at a side of the intermediate shaft 95. The propeller shaft 29 has thereon a shift gear 102, which is slidably but non-rotatably mounted and may be meshed selectively with one of the gears 98 and 101, and a freely rotatable gear 103 which meshes with the third gear 99 on the intermediate shaft 95. On the propeller shaft 29 is further mounted a clutch 104 which is operable to couple either the gear 103 or change-shaft 92 to the propeller shaft 29. A first speed ratio or so-called creeper-drive ratio is achieved when the shift gear 102 is meshed with gear 101, whereas a second speed ratio is achieved when the shift gear 102 is meshed with gear 98. A third speed ratio is achieved when gear 103 is coupled to the propeller shaft 29 using clutch 104, whereas a fourth speed ratio is achieved when the change shaft 92 is coupled directly to the propeller shaft using the clutch 104.

In the auxiliary implement-driving power transmission path, two transmission shafts 106 and 107 are incorporated which are disposed co-axially with the aforementioned clutch shaft 57 in series and are connected to the clutch shaft. The aforementioned PTO speed change mechanism 35 is disposed between the transmission shaft 107 and a hollow change shaft 108 which is rotatably mounted on the PTO shaft 33. This change mechanism 35 includes two gears 109 and 110, which are fixedly mounted on the transmission shaft 107, and two gears 111 and 112 which are rotatably mounted on the change shaft 108 and are meshed, respectively, with gears 109 and 110. A clutch 113 is mounted on the change shaft 108 for selectively coupling one of the gears 111 and 112 to this change shaft so as to achieve one of the first and second speed ratios.

As also shown in FIG. 2, a drive shaft 117 which is driven to rotate by the propeller shaft 29 via meshing gears 115 and 116 is provided for driving PTO shaft 33 at a speed proportional to that of the vehicle. This drive shaft 118 has on its rear end a co-rotatable gear 118 which meshes with a gear 119 rotatably mounted on the PTO shaft 33. The aforementioned PTO selecting clutch 36 is mounted on the PTO shaft so that it is operable to couple either the hollow change shaft 108 or gear 119 so as to rotate the shaft 33 with a speed independent of that of the vehicle or with a speed proportional to that of the vehicle.

As shown in FIG. 4, the aforementioned PTO-clutch 34 includes opposite sets of frictional elements which are slidably but non-rotatably supported respectively by a rotatable support 121, fixedly mounted on a rear end of the second input shaft 17, and by a clutch casing 122 fixedly mounted on the clutch shaft 57. The fluid passage 61 in a side wall of the rear housing 28 communicates with an operating fluid passage 123, in the clutch shaft 57, which in turn communicates with a fluid chamber 34b behind a clutch piston 34a of the PTO clutch.

I claim:

1. In a tractor having a clutch housing and transmission casing which are arranged in series in a longitudinal direction of the tractor and are fastened together, the clutch housing including in its front end portion a main clutch and the transmission casing including therein a first input shaft incorporated in a vehicle-driving power transmission path and a second input shaft incorporated in an auxiliary implement-driving power transmission path, a transmission assembly which includes between the clutch housing and transmission casing a hollow shaft means for transmitting power of an engine to said first input shaft and a power takeoff shaft means for transmitting power of the engine to said second input shaft, said power takeoff shaft means passing through said hollow shaft means, characterized in:

that a hollow drive shaft (8) drivenly connected to the engine (25) via the main clutch (3), a hollow intermediate shaft (9) disposed behind and co-axially with said drive shaft, and a speed-change shaft (10) disposed parallel to said drive shaft are journalled in said clutch housing (1) using a front bearing support frame (6), fixedly mounted on a front surface of an internal flange (5) on said clutch housing, and a rear bearing support frame (7) fixedly mounted on a front surface of a rear wall of said clutch housing, said front bearing support frame having a forwardly extending support sleeve (4) located around said drive shaft for slidably supporting a release shifter (4) for releasing said main clutch, a two-ratio speed change mechanism (11) being disposed between said drive shaft and said speed-change shaft, and said speed-change shaft being connected drivingly to said intermediate shaft via meshing gears (12, 13);

that said first input shaft (14) is formed into a hollow shaft and is journalled in said transmission casing (2) co-axially with said intermediate shaft (9), a front end of said first input shaft projecting into said clutch housing (1) and being coupled to said intermediate shaft using a splined connection (15); and that a power takeoff drive shaft (16) driven by the engine (25) is provided which extends through said hollow drive shaft (8), said second input shaft (17) extending through said first input shaft (14) and being coupled at its front end to said power takeoff drive shaft using a coupling sleeve (18) which is disposed within said hollow intermediate shaft (9).

2. A transmission assembly as set forth in claim 1, wherein said two-ratio speed change mechanism (11) is fashioned to a fluid-operated mechanism having two fluid-actuated clutches (19, 20) mounted on said speed-change shaft (10), and wherein said rear bearing support frame (7) is provided with a cylindrical bore (23) which receives a rear end portion of said speed-change shaft such that annular grooves (21a, 22a) in an outer surface of said change shaft, communicating with clutch-operating fluid passages (21, 22) in said change shaft, are sealed by an inner circumferential wall of said cylindrical bore.

* * * * *